United States Patent
Maruyama et al.

(10) Patent No.: US 11,012,379 B2
(45) Date of Patent: May 18, 2021

(54) CONTROLLER AND CONTROL SYSTEM FOR CHATTING

(71) Applicant: FUJI XEROX CO., LTD., Tokyo (JP)

(72) Inventors: Satoshi Maruyama, Kanagawa (JP); Yohei Makino, Kanagawa (JP); Ryo Matsumoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/554,579

(22) Filed: Aug. 28, 2019

(65) Prior Publication Data
US 2020/0304436 A1 Sep. 24, 2020

(30) Foreign Application Priority Data
Mar. 20, 2019 (JP) .............................. JP2019-052359

(51) Int. Cl.
*H04L 12/58* (2006.01)
*H04L 29/08* (2006.01)
*H04L 12/18* (2006.01)

(52) U.S. Cl.
CPC .......... *H04L 51/02* (2013.01); *H04L 12/1813* (2013.01); *H04L 51/04* (2013.01); *H04L 51/046* (2013.01); *H04L 51/18* (2013.01); *H04L 67/06* (2013.01)

(58) Field of Classification Search
CPC ............... G06F 16/176; G06F 16/2358; H04L 12/1813; H04L 51/04; H04L 51/08; H04L 51/18; H04L 65/4015; H04L 65/403; H04L 51/02; H04L 51/046
See application file for complete search history.

(56) References Cited

U.S. PATENT DOCUMENTS

| | | | |
|---|---|---|---|
| 7,970,850 B1 * | 6/2011 | Callanan | H04L 51/046 709/207 |
| 9,621,492 B2 | 4/2017 | Park et al. | |
| 2005/0033811 A1 * | 2/2005 | Bhogal | G06Q 40/00 709/206 |
| 2005/0033813 A1 * | 2/2005 | Bhogal | G06Q 10/10 709/206 |
| 2007/0005754 A1 * | 1/2007 | Horvitz | H04L 67/22 709/224 |
| 2013/0166275 A1 | 6/2013 | Yang et al. | |

(Continued)

FOREIGN PATENT DOCUMENTS

| | | |
|---|---|---|
| JP | 2014225268 | 12/2014 |
| JP | 2015-144027 | 8/2015 |
| JP | 2015179519 | 10/2015 |

*Primary Examiner* — Jeong S Park
(74) *Attorney, Agent, or Firm* — JCIPRNET

(57) ABSTRACT

A controller includes an extractor configured such that, if plural talk rooms exist where information is portable and viewable by each of plural users and, when instruction information including a file and an instruction to execute processing for the file is posted, the processing associated with the posted instruction information is executable, and if a talk room where the instruction information is posted differs from a talk room where the processing associated with the instruction information is executed, a difference between the file before the processing and the file after the processing is extracted when the processing associated with the instruction information is executed.

18 Claims, 11 Drawing Sheets

(56) References Cited

U.S. PATENT DOCUMENTS

| | | | |
|---|---|---|---|
| 2014/0189818 A1* | 7/2014 | Meyer | H04L 63/08 |
| | | | 726/4 |
| 2016/0043975 A1 | 2/2016 | Park et al. | |
| 2016/0134568 A1* | 5/2016 | Woo | H04L 51/02 |
| | | | 709/206 |
| 2016/0191578 A1* | 6/2016 | Kim | H04L 51/04 |
| | | | 709/204 |
| 2020/0104015 A1* | 4/2020 | Li | H04L 51/16 |
| 2020/0204511 A1* | 6/2020 | Choi | H04L 51/08 |

* cited by examiner

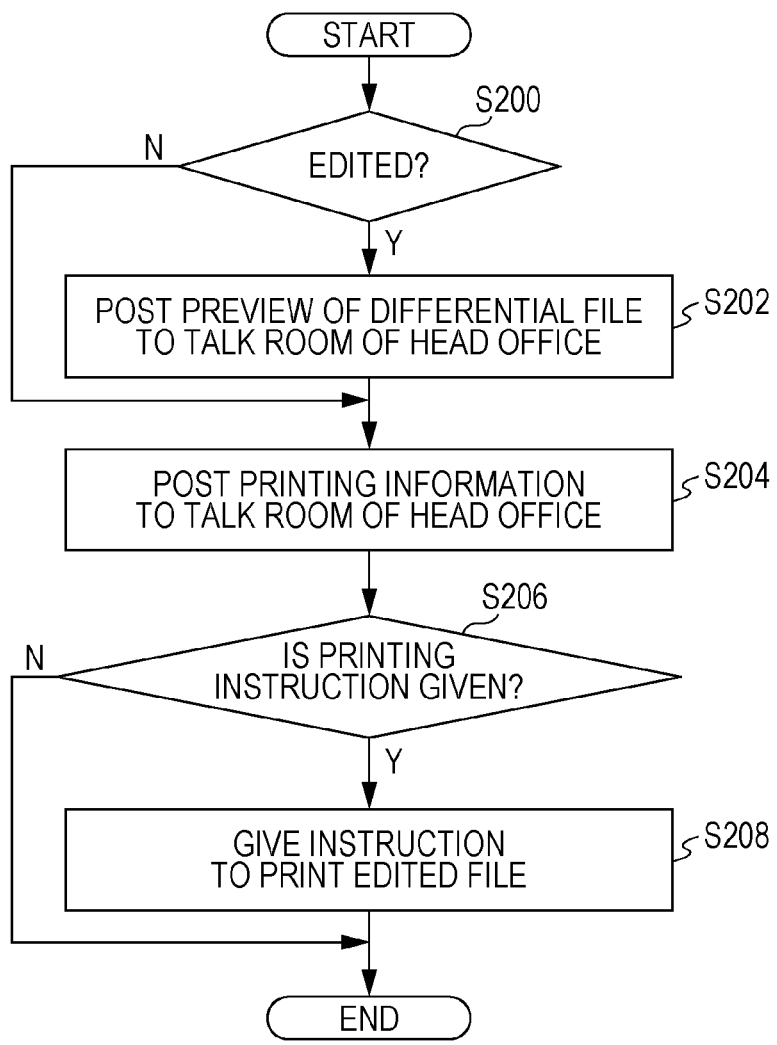

007# CONTROLLER AND CONTROL SYSTEM FOR CHATTING

CROSS-REFERENCE TO RELATED APPLICATIONS

This application is based on and claims priority under 35 USC 119 from Japanese Patent Application No. 2019-052359 filed Mar. 20, 2019.

BACKGROUND

(i) Technical Field

The present disclosure relates to a controller and a control system.

(ii) Related Art

Japanese Unexamined Patent Application Publication No. 2015-179519 proposes an information providing system in which a user adds a virtual friend software robot to friends via an instant messaging application executed in a user terminal. The software robot is implemented by an artificial intelligence software program. Specifically, in the information providing system, a message is received from the user terminal via a talk session where the software robot participates and a response message generated by the software robot participating in the talk session is provided to the user terminal via the talk session.

Japanese Unexamined Patent Application Publication No. 2015-144027 proposes a control server in which, when a message indicates a control instruction for a predetermined electric apparatus, a message that responds to the control instruction and includes phrases that make a user feel as if the electric apparatus gave the message voluntarily is written onto an electronic message board.

Japanese Unexamined Patent Application Publication No. 2014-225268 proposes an information providing system that executes an information providing method via an instant messaging application. Specifically, the information providing system receives a message transmitted from a user to a software robot via a messaging application of a user terminal. The information providing system searches a database for a response by using the message as a query and transmits the response to the user via the messaging application of the user terminal.

SUMMARY

Aspects of non-limiting embodiments of the present disclosure relate to a controller and a control system in which, if a plurality of talk rooms exist where information is postable and viewable by each of a plurality of users and, when an instruction for specific processing is posted, the processing associated with the posted instruction is executable, a user may check that the processing associated with the instruction is executed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a controller comprising an extractor configured such that, if a plurality of talk rooms exist where information is portable and viewable by each of a plurality of users and, when instruction information including a file and an instruction to execute processing for the file is posted, the processing associated with the posted instruction information is executable, and if a talk room where the instruction information is posted differs from a talk room where the processing associated with the instruction information is executed, a difference between the file before the processing and the file after the processing is extracted when the processing associated with the instruction information is executed.

BRIEF DESCRIPTION OF THE DRAWINGS

An exemplary embodiment of the present disclosure will be described in detail based on the following figures, wherein:

FIG. 14 is a flowchart illustrating an example of a flow of processing to be performed in the talk room of the head office by the chatbot server of the control system according to the exemplary embodiment.

DETAILED DESCRIPTION

Figure 1:
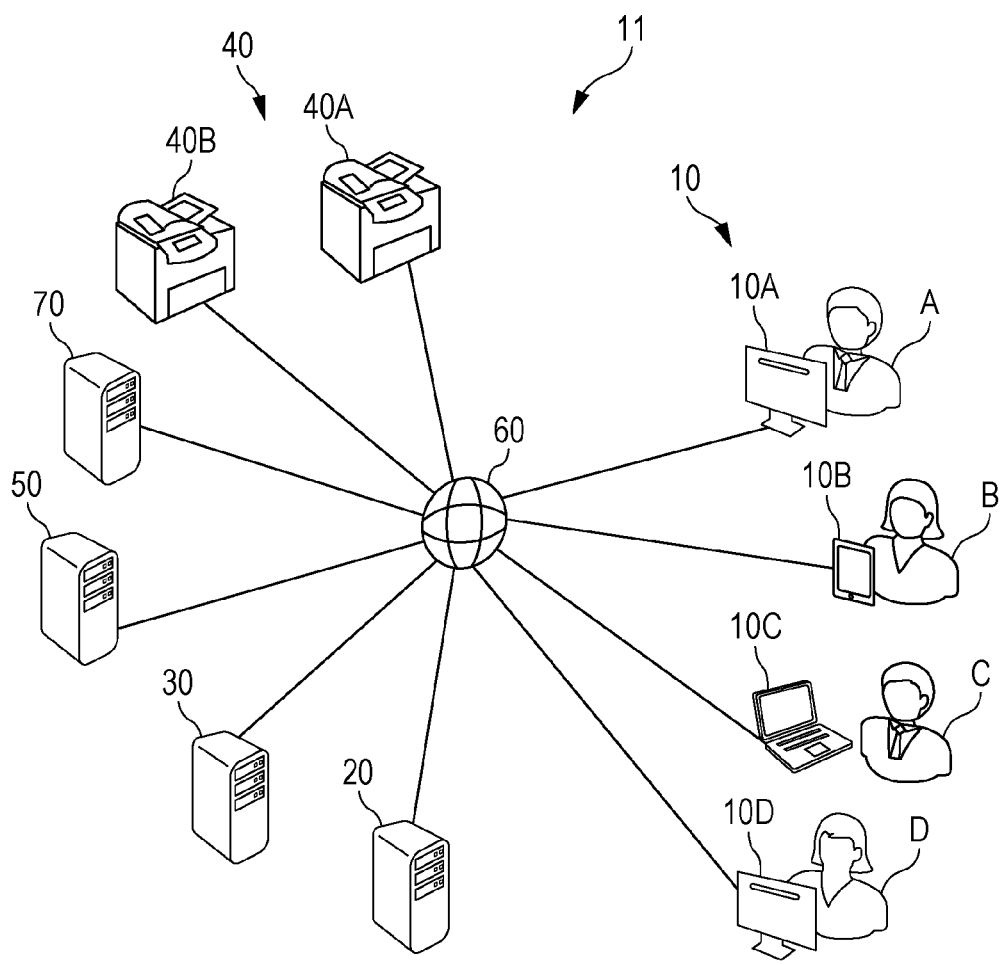
FIG. 1 illustrates the overall configuration of a control system according to an exemplary embodiment.

An example of an exemplary embodiment of the present disclosure is described below in detail with reference to the drawings. In the drawings, the same or equivalent components and parts are represented by the same reference symbols. The dimensional ratios in the drawings are exaggerated for convenience of description and may differ from actual ratios. FIG. 1 illustrates the overall configuration of a control system according to this exemplary embodiment.

A control system 11 includes user terminals 10, a talk room server 20 serving as a provider, a chatbot server 30 serving as a controller, information processing apparatuses 40, a document server 50, and a difference extraction server 70 serving as the controller. The user terminals 10, the talk room server 20, the chatbot server 30, the information processing apparatuses 40, the document server 50, and the difference extraction server 70 are mutually connected via a communication network 60 such as the Internet.

The user terminal 10 is used by a user and may be any terminal such as a desktop computer, a notebook personal computer, a tablet, or a smartphone. In FIG. 1, a user A uses a user terminal 10A, a user B uses a user terminal 10B, a user C uses a user terminal 10C, and a user D uses a user terminal 10D. The user terminals 10A to 10D are referred to collectively as the user terminals 10.

The talk room server 20 provides a talk room as a service. The talk room is a virtual space where the user and a chatbot described later may participate and share messages and files (electronic information such as an image file and a document file) in a chat. The chat is a conversation held by inputting information in real time by a plurality of members on a computer network. The members include both a user associated with a real person and a software robot that operates in accordance with a specific rule. The chatbot is a software robot that performs control so that specific processing is executed based on information posted by the user in the talk room. A plurality of users may participate in the talk room or one user may participate in the talk room instead.

The user may post a message or give a speech in the talk room via the user terminal 10. In the talk room, the users may share a message and the chatbot may reply to a user's message. In the talk room, the user may give an instruction to the chatbot so that the information processing apparatus 40 executes specific processing. For example, the chatbot extracts the instruction included in a message through natural language processing and controls the information processing apparatus 40 to execute the specific processing. A user and the chatbot may participate in the talk room in a one-to-one relationship or a plurality of users and the chatbot may participate in the talk room. A plurality of talk rooms may exist as many as those established.

The chatbot server 30 manages the chatbot. As described above, the chatbot participates in a talk room and responds to a user's message or causes the information processing apparatus 40 to execute specific processing in response to an instruction included in a message.

When a message related to an instruction to cause the information processing apparatus 40 to execute specific processing is posted to a talk room where the chatbot participates, the chatbot performs control so that the information processing apparatus 40 registered in association with a user participating in the talk room executes the specific processing. The information processing apparatus 40 may perform any information processing. Examples of the information processing include processing of executing printing as an example of output of a file including character information or image information, processing of editing a file, processing of generating or manipulating information by using equipment in the information processing apparatus 40, and processing of exchanging information between the information processing apparatus 40 and other apparatuses. The following description is directed to an example in which the information processing apparatus 40 is an image forming apparatus and the instruction to execute the specific processing is an instruction to execute printing. The image forming apparatus is hereinafter represented by reference symbol "40". The instruction to execute printing may include not only a direct printing instruction for the image forming apparatus 40 but also an instruction to provide, in the talk room, information necessary to generate a print job, such as image information for printing or printing specifications.

The image forming apparatus 40 forms an image on a recording medium such as paper based on a print job and may be any apparatus such as a printer or a multifunction peripheral. In the example of the control system of FIG. 1, an image forming apparatus 40A and an image forming apparatus 40B are managed by the chatbot server 30. The image forming apparatus 40A and the image forming apparatus 40B are referred to collectively as the image forming apparatuses 40. In the illustrated example, the image forming apparatus 40 is connected to the chatbot server 30 via the communication network 60 but may be connected directly to the chatbot server 30.

The document server 50 stores files including document information and image information to be printed by the image forming apparatus 40. The files stored in the document server 50 may be viewed or edited in response to an instruction from the chatbot server 30 or the user terminal 10. Functions of the document server 50 may be provided in the talk room server 20 or the chatbot server 30.

The difference extraction server 70 provides a difference check service. The difference check service provides processing of extracting a difference between two files as requested. In this exemplary embodiment, a difference between files before and after editing is extracted.

Next, the hardware configurations of the talk room server 20, the chatbot server 30, the document server 50, and the difference extraction server 70 are described.

Figure 2:
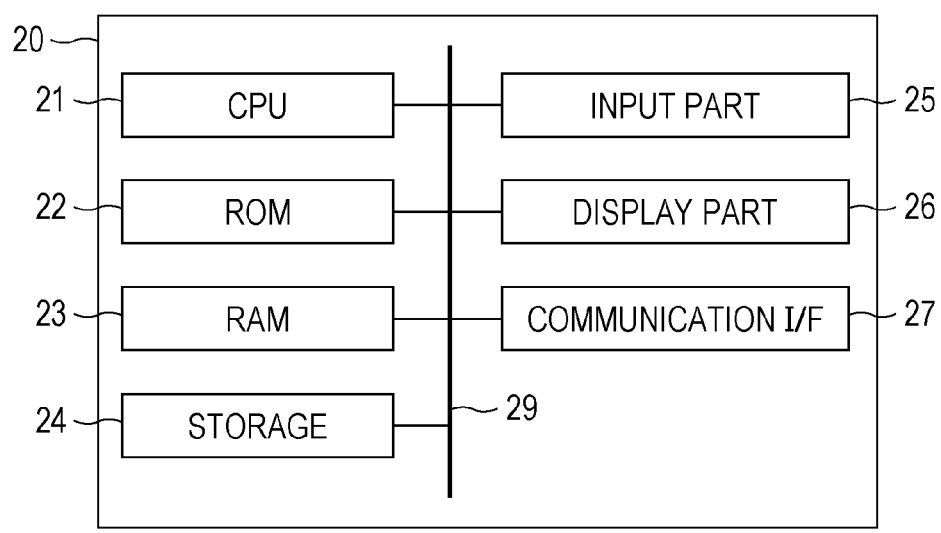
FIG. 2 is a block diagram illustrating the hardware configuration of a talk room server.

First, the hardware configuration of the talk room server 20 is described. FIG. 2 is a block diagram illustrating the hardware configuration of the talk room server 20.

As illustrated in FIG. 2, the talk room server 20 includes a central processing unit (CPU) 21, a read only memory (ROM) 22, a random access memory (RAM) 23, a storage 24, an input part 25, a display part 26, and a communication interface (I/F) 27. Those components are mutually connected via a bus 29 in a communicable manner.

The CPU 21 executes various programs and controls the respective parts. That is, the CPU 21 reads a program from the ROM 22 or the storage 24 and executes the program by using the RAM 23 as a working area. The CPU 21 controls the respective components and performs various types of arithmetic processing based on the programs stored in the ROM 22 or the storage 24. In this exemplary embodiment, the ROM 22 or the storage 24 stores a talk room providing program for providing a talk room.

The ROM 22 stores various programs and various types of information. The RAM 23 temporarily stores a program or information as the working area. The storage 24 is a hard disk drive (HDD) or a solid state drive (SSD) and stores various programs including an operating system and various types of information.

The input part 25 includes a keyboard and a pointing device such as a mouse and is used for various input operations. For example, the display part 26 is a liquid crystal display and displays various types of information. The display part 26 may function as the input part 25 by employing a touch panel system. The communication interface 27 is used for communication with other apparatuses via the communication network 60. For example, Ethernet (registered trademark), FDDI, Wi-Fi (registered trademark), or any other standard is used.

Figure 3:
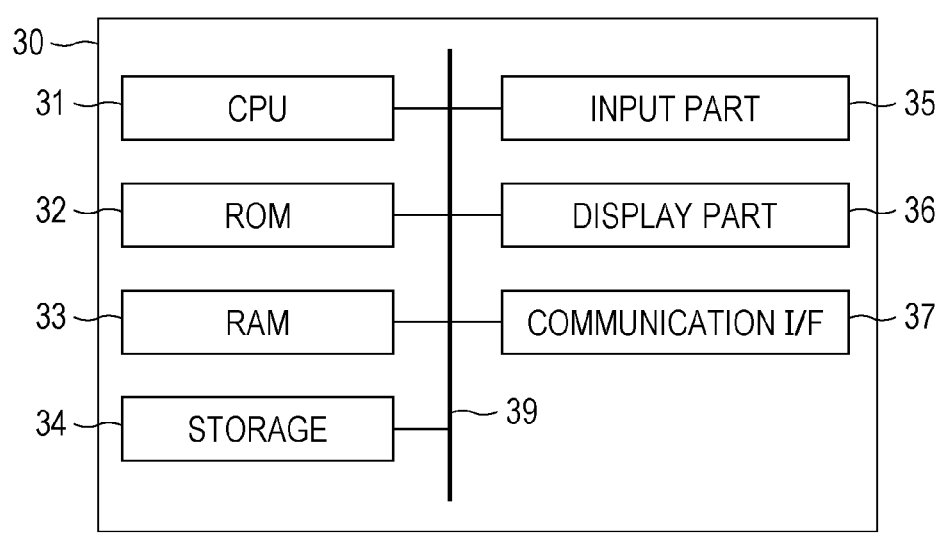
FIG. 3 is a block diagram illustrating the hardware configuration of a chatbot server.

Next, the hardware configuration of the chatbot server 30 is described. FIG. 3 is a block diagram illustrating the hardware configuration of the chatbot server 30.

As illustrated in FIG. 3, the chatbot server 30 includes a CPU 31, a ROM 32, a RAM 33, a storage 34, an input part 35, a display part 36, and a communication interface (I/F) 37. Those components are mutually connected via a bus 39 in a communicable manner. The components of the chatbot server 30 have similar functions to those of the components of the talk room server 20 of FIG. 2.

Figure 4:
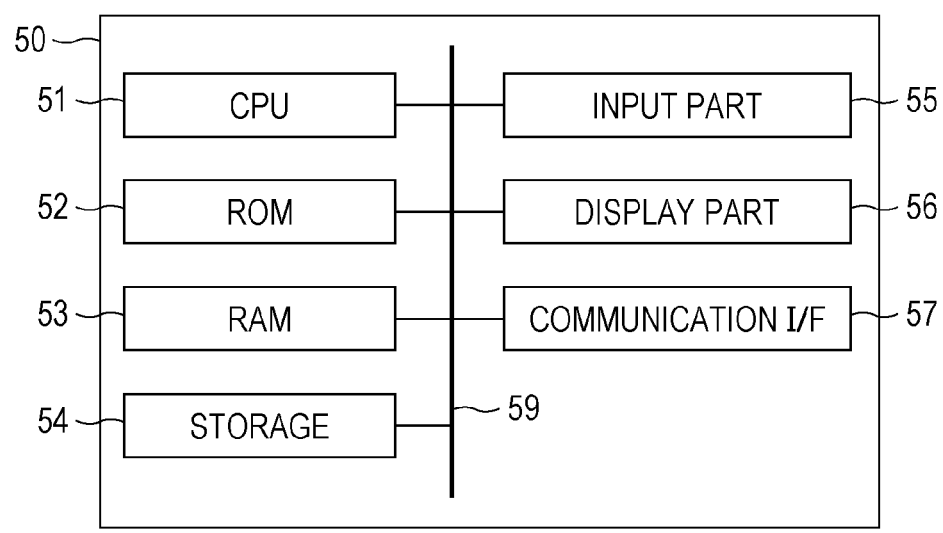
FIG. 4 is a block diagram illustrating the hardware configuration of a document server.

Next, the hardware configuration of the document server 50 is described. FIG. 4 is a block diagram illustrating the hardware configuration of the document server 50.

As illustrated in FIG. 4, the document server 50 includes a CPU 51, a ROM 52, a RAM 53, a storage 54, an input part 55, a display part 56, and a communication interface (I/F) 57. Those components are mutually connected via a bus 59 in a communicable manner. The components of the document server 50 have similar functions to those of the components of the talk room server 20 of FIG. 2.

Figure 5:
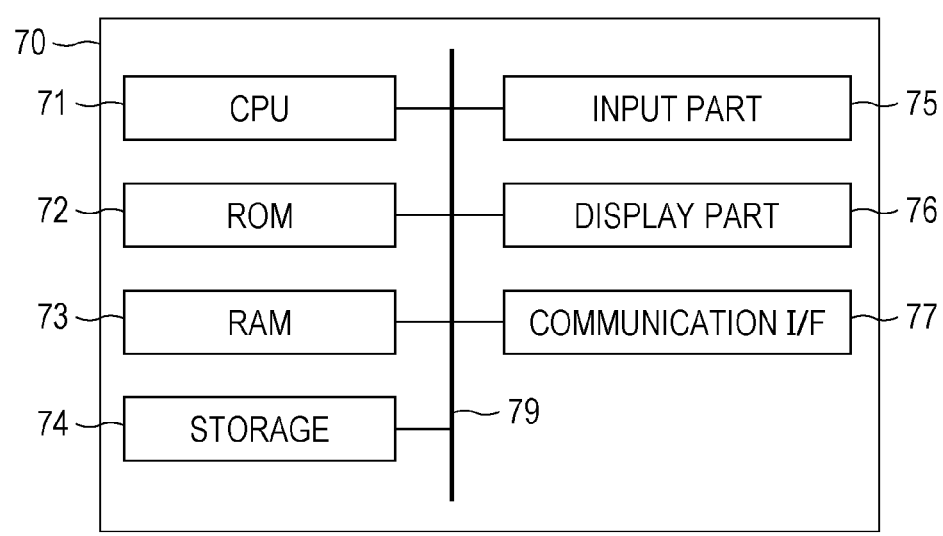
FIG. 5 is a block diagram illustrating the hardware configuration of a difference extraction server.

Next, the hardware configuration of the difference extraction server 70 is described. FIG. 5 is a block diagram illustrating the hardware configuration of the difference extraction server 70.

As illustrated in FIG. 5, the difference extraction server 70 includes a CPU 71, a ROM 72, a RAM 73, a storage 74, an input part 75, a display part 76, and a communication interface (I/F) 77. Those components are mutually connected via a bus 79 in a communicable manner. The components of the difference extraction server 70 have similar functions to those of the components of the talk room server 20 of FIG. 2.

Next, the functional configurations of the talk room server 20 and the chatbot server 30 are described.

Figure 6:
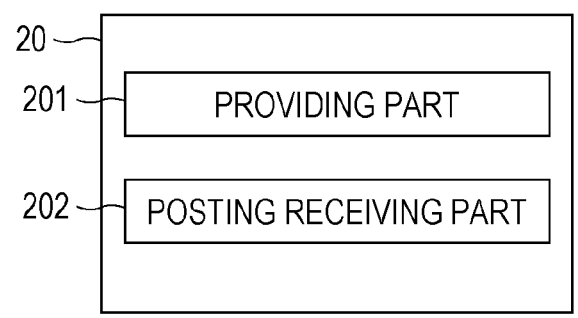
FIG. 6 is a block diagram illustrating an example of the functional configuration of the talk room server.

First, the functional configuration of the talk room server 20 is described. FIG. 6 is a block diagram illustrating an example of the functional configuration of the talk room server 20.

As illustrated in FIG. 6, the talk room server 20 includes a providing part 201 and a posting receiving part 202 as functional components. Those functional components are implemented such that the CPU 21 reads the talk room providing program stored in the ROM 22 or the storage 24 and executes the talk room providing program by loading the talk room providing program on the RAM 23.

The providing part 201 provides, as a service, a talk room where a plurality of users may participate and post messages. For example, the talk room server 20 provides a talk room where a user and the chatbot participate in a one-to-one relationship and a talk room where a plurality of users and the chatbot participate. A plurality of talk rooms may be established in response to establishment requests from users. For example, when a certain user establishes a specific talk room by accessing the talk room server 20 and making an establishment request for the talk room, the establishing user may invite other users to the established talk room as participants. Users participating in the talk room may newly invite, as participants in the talk room, other users who do not participate in the talk room.

The posting receiving part 202 receives information input via the user terminal 10 operated by a user participating in a talk room and posts the input information to the talk room provided by the providing part 201. The information posted to the talk room is displayed on the user terminal 10 in a predetermined direction in order of posts.

Figure 7:
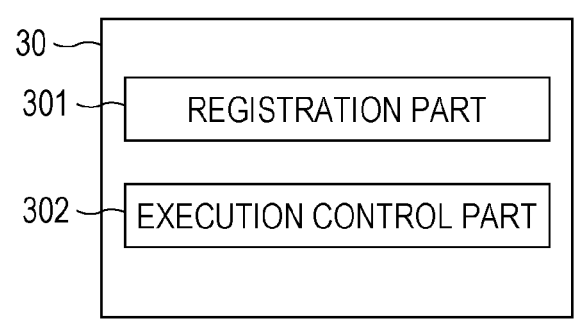
FIG. 7 is a block diagram illustrating an example of the functional configuration of the chatbot server.

Next, the functional configuration of the chatbot server 30 is described. FIG. 7 is a block diagram illustrating an example of the functional configuration of the chatbot server 30.

As illustrated in FIG. 7, the chatbot server 30 includes, as functional components, a registration part 301 and an execution control part 302 serving as a generator. Those functional components are implemented such that the CPU 31 reads a control program stored in the ROM 32 or the storage 34 and executes the control program by loading the control program on the RAM 33.

For example, the registration part 301 registers the users in association with the image forming apparatuses 40. By registering the image forming apparatuses 40 in association with the users, printing is performed by using the image forming apparatuses 40 in response to requests from the users.

The execution control part 302 participates in a talk room as the chatbot and controls a conversation with a user participating in the talk room. Further, the execution control part 302 controls execution of processing such as printing or editing based on posting from the user. For example, when an instruction to cause the image forming apparatus (information processing apparatus) 40 to perform printing is received in the talk room or when an instruction message related to the instruction is posted by the user, the execution control part 302 performs control so that one of the image forming apparatuses 40 associated with the user participating in the talk room executes printing. Even if the instruction message, is posted to the talk room by a user who is not associated with the image forming apparatus 40, the execution control part 302 controls one image forming apparatus 40 to execute printing. When a file editing instruction is received as the instruction to execute processing, the execution control part 302 edits a file based on posting. As an example of the file editing instruction, if an image is present in the file, image information is posted and a message reading "CHANGE IMAGE IN FILE TO THIS IMAGE" is posted. Then, the execution control part 302 performs processing of changing the image in the file to the image indicated by the posted image information.

If a first user belonging to a talk room posts instruction information including a file and an instruction to execute processing for the file to the talk room for a second user different from the first user, the execution control part 302 generates, independently of the talk room where the instruction information is posted, an individual talk room where the second user belongs and posting related to the file is received. The individual talk room is generated such that the execution control part 302 requests the talk room server 20 to generate the individual talk room. The first user may designate the second user by name, by an attribute such as a title (for example, "full-timer" or "part-timer") or a group, or by a word that means a plurality of persons, such as "all" or "everyone". The second user need not belong to the talk room where the first user posts the instruction information. The second user is automatically invited to the individual talk room along with the generation of the individual talk room. The users and their attributes are prestored in association with each other in the chatbot server 30 or a different server such as an authentication server. For example, when the users and their attributes are prestored in the chatbot server 30, the registration part 301 preregisters the users and the attributes in the storage 34 in association with each other. Examples of the attribute to be registered for each user include a title (for example, a job title or "full-timer" or "part-timer"), an organization (for example, "AAA office", "BBB shop", "CCC department", or "DDD section"), authority (for example, editing authority or printing authority), and a schedule (for example, attendance information indicating workdays and holidays).

When the individual talk room is generated, the execution control part 302 generates an individual talk room where the instruction information, the file, or a combination of the instruction information and the file is posted.

The execution control part 302 also participates in the individual talk room as the chatbot and controls a conversation with the user participating in the individual talk room. Further, the execution control part 302 controls execution of processing such as printing or editing based on posting from the user.

Figure 8:
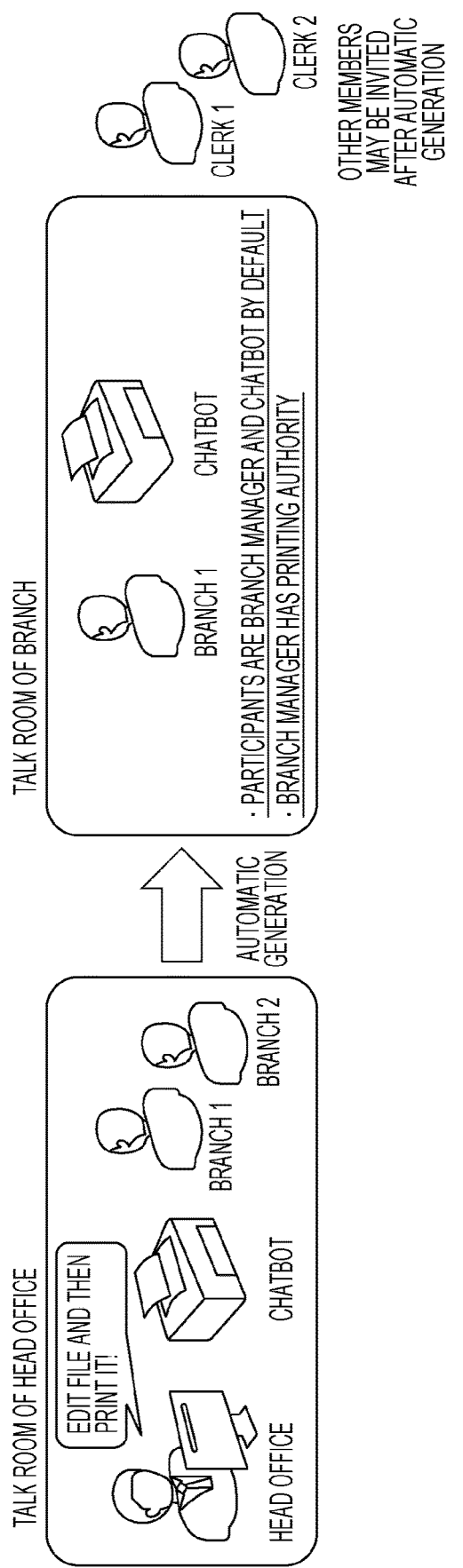
FIG. 8 illustrates generation of an individual talk room by an execution control part.

Next, the generation of the individual talk room by the execution control part 302 is described taking a specific example. FIG. 8 illustrates the generation of the individual talk room by the execution control part 302. In the example of FIG. 8, it is assumed that the chatbot is used in a retailer (for example, a supermarket or a convenience store). It is assumed that managers of a head office and branches are present in a talk room.

An individual talk room of each branch is generated when the chatbot determines in a talk room of the head office that file editing and print settings are necessary at the branch based on details of a conversation between the head office and the branch.

Figure 9:
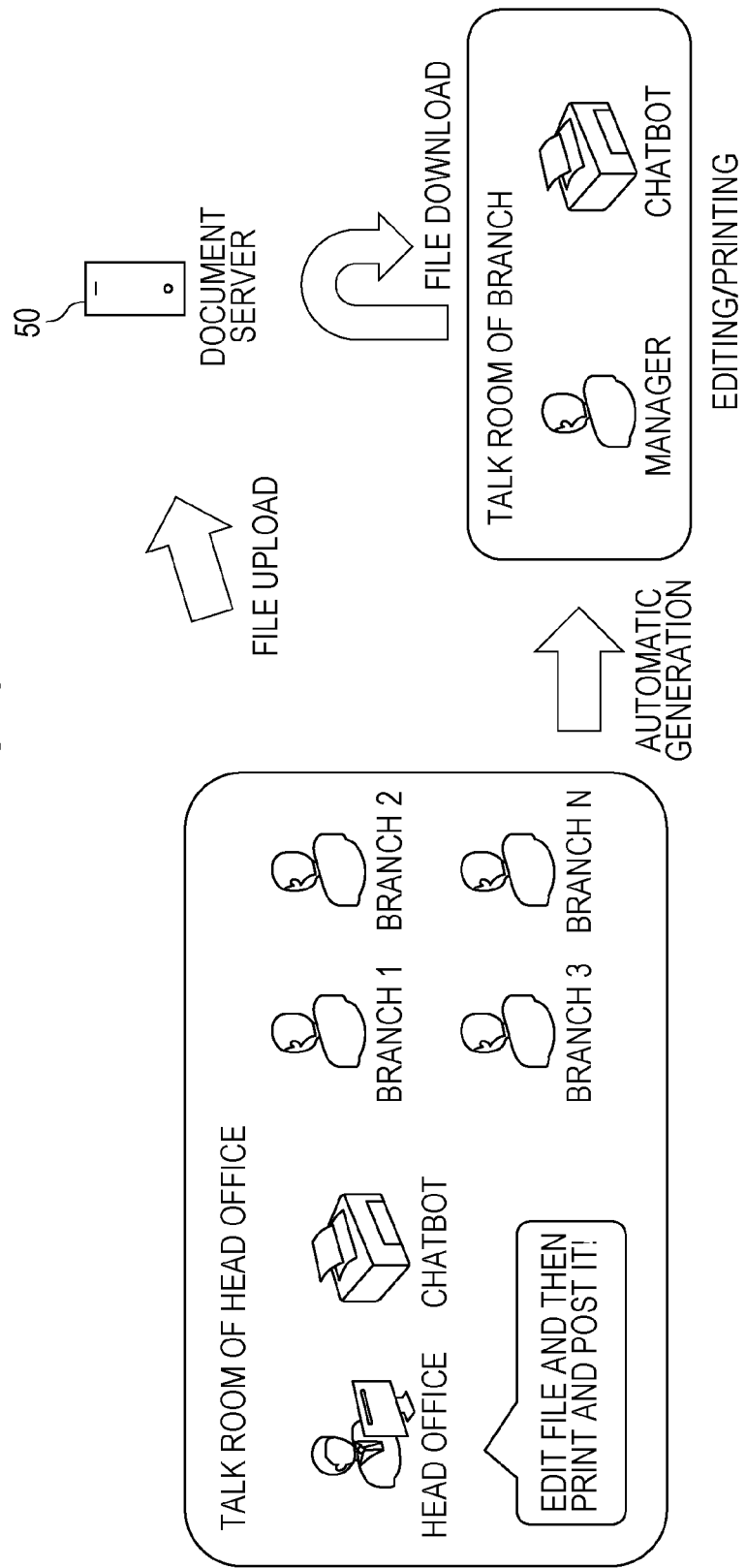
FIG. 9 illustrates an example of file posting from a talk room of a head office to a talk room of a branch.

For example, when the manager of the head office posts a message related to an instruction for editing and printing (for example, "EDIT FILE AND THEN PRINT IT!") as instruction information including a target file as illustrated in FIG. 8, the execution control part 302 generates a talk room of the branch as the individual talk room. For example, the individual talk room is generated such that the execution control part 302 instructs the talk room server 20 to generate the individual talk room. When the individual talk room is generated, the execution control part 302 may post the file for editing and printing to the individual talk room. As illustrated in FIG. 9, the file may be uploaded to the document server 50, acquired by being downloaded from the document server 50, and posted to the individual talk room. When the talk room of the branch is generated as the individual talk room, only the branch manager and the chatbot may participate in the talk room of the branch by default and only the branch manager may have printing authority as illustrated in FIGS. 8 and 9. Clerks of the branch (such as clerk 1 and clerk 2) may be invited to the individual talk room after the individual talk room has been generated.

When the individual talk room is generated, the execution control part 302 participates in the individual talk room as the chatbot and controls execution of processing such as printing or editing.

When an instruction to execute the processing is given in the individual talk room of the branch, the manager of the head office is unable to check edited contents.

In this exemplary embodiment, when the instruction to execute the processing is given in the individual talk room, the chatbot transmits the files before and after the processing to the difference extraction server 70, requests extraction of a difference, and posts a difference extraction result to the talk room of the head office.

Figure 10:
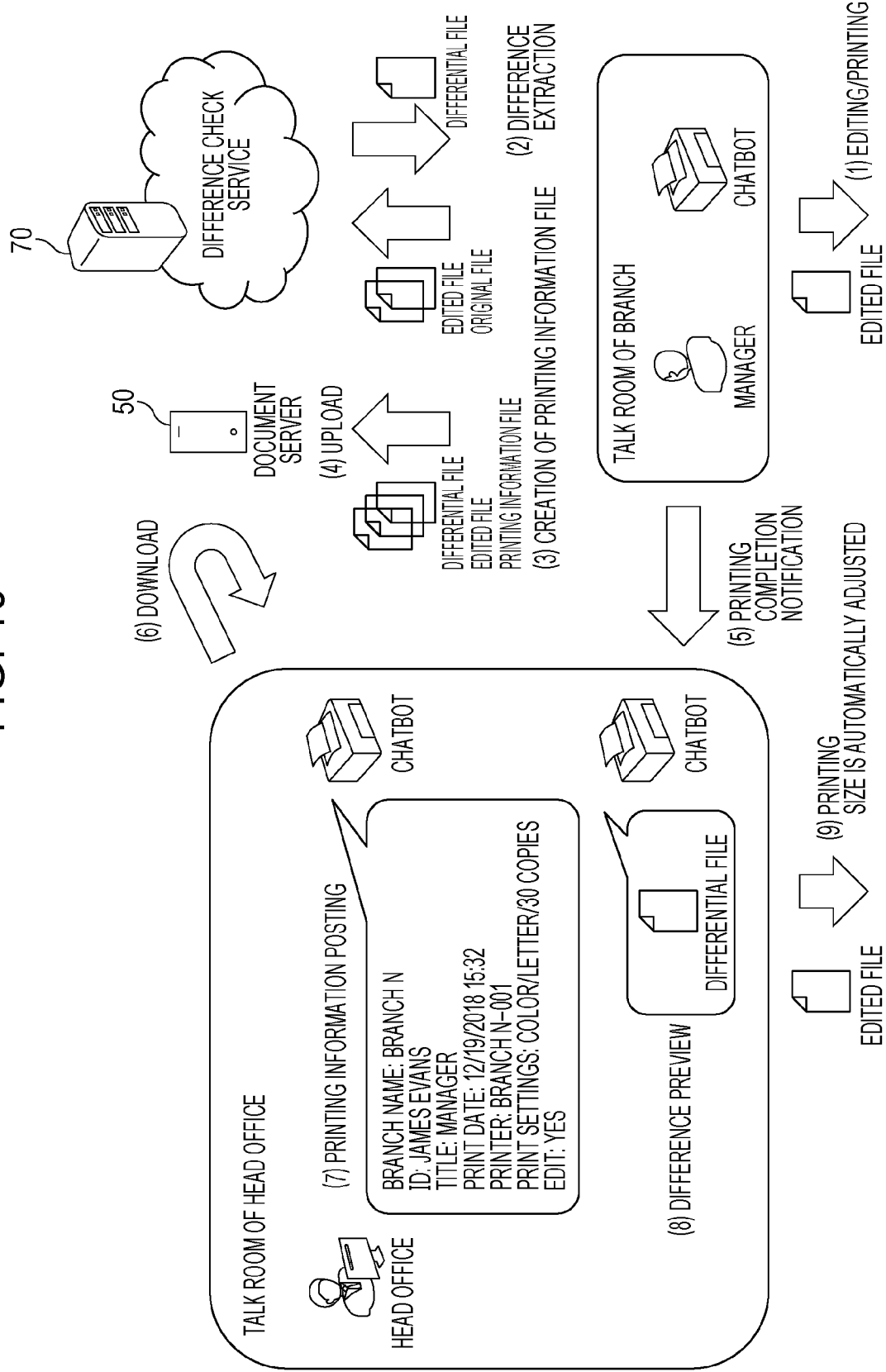
FIG. 10 illustrates an example of a flow of processing to be performed when a file is edited and then printed in the talk room of the branch, which is the individual talk room, in the control system according to the exemplary embodiment.

For example, in the control system 11 according to this exemplary embodiment, processing is performed through procedures illustrated in FIG. 10. FIG. 10 illustrates an example of a flow of processing to be performed when a file is edited and then printed in the talk room of the branch, which is the individual talk room, in the control system 11 according to this exemplary embodiment.

First, an instruction to print the file after editing is posted to the talk room of the branch. Then, the chatbot instructs the image forming apparatus 40 to print the file after editing ((1) in FIG. 10).

The chatbot of the branch creates a differential file by transmitting the unedited file for which the printing instruction is given from the head office and the edited file to the difference check service provided by the difference extraction server 70 ((2) in FIG. 10).

Next, the chatbot generates a printing information file by extracting information on, for example, an ID and a title from account information of a person who gives the printing instruction and extracting, for example, print settings and a print date at the time of printing and printer information from a log of the image forming apparatus 40 ((3) in FIG. 10). The chatbot uploads the differential file, the edited file, and the printing information file to the document server 50 ((4) in FIG. 10).

When the chatbot is notified of printing completion by the image forming apparatus 40, the chatbot gives a printing completion notification by posting a message indicating the printing completion to the talk room of the head office ((5) in FIG. 10).

When the printing completion notification is given to the talk room of the head office, the chatbot downloads various files from the document server 50 in the talk room of the head office ((6) in FIG. 10) and posts the printing information and a preview of the differential file ((7) and (8) in FIG. 10).

Figure 11:
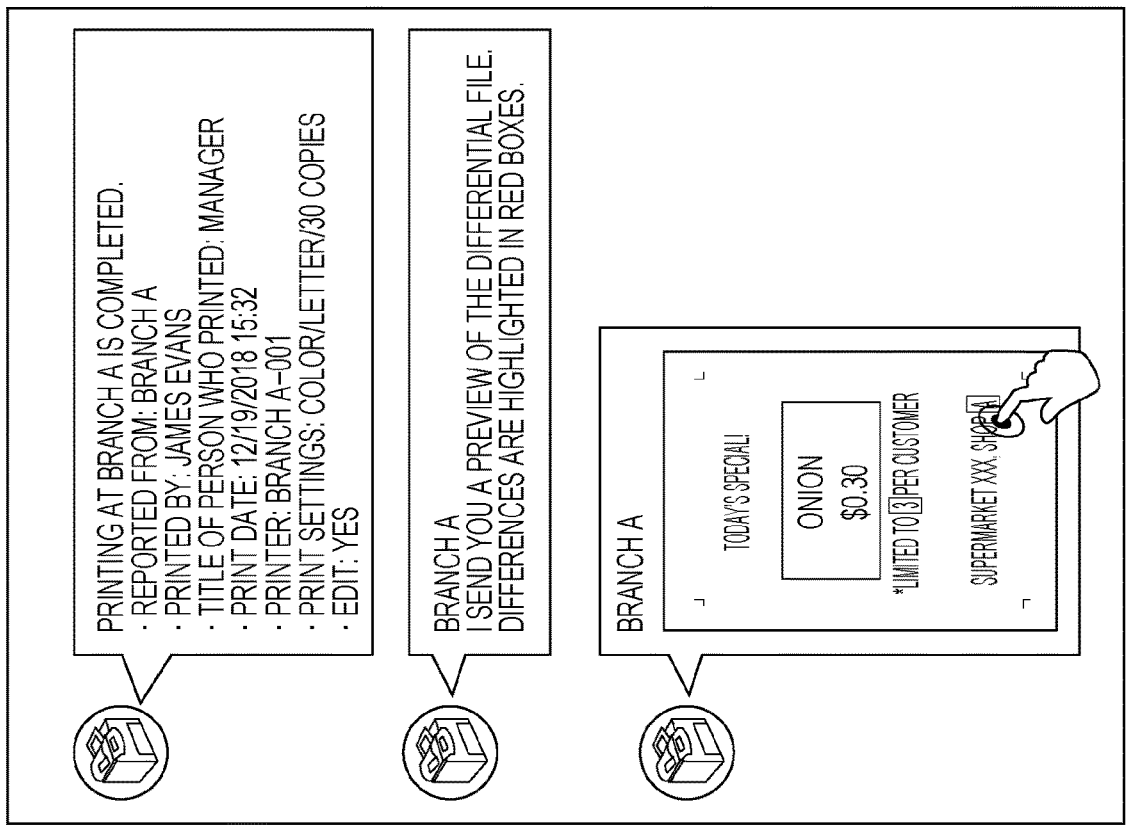
FIG. 11 illustrates a display example of a difference preview and a printing instruction for an edited file.
Figure 12:
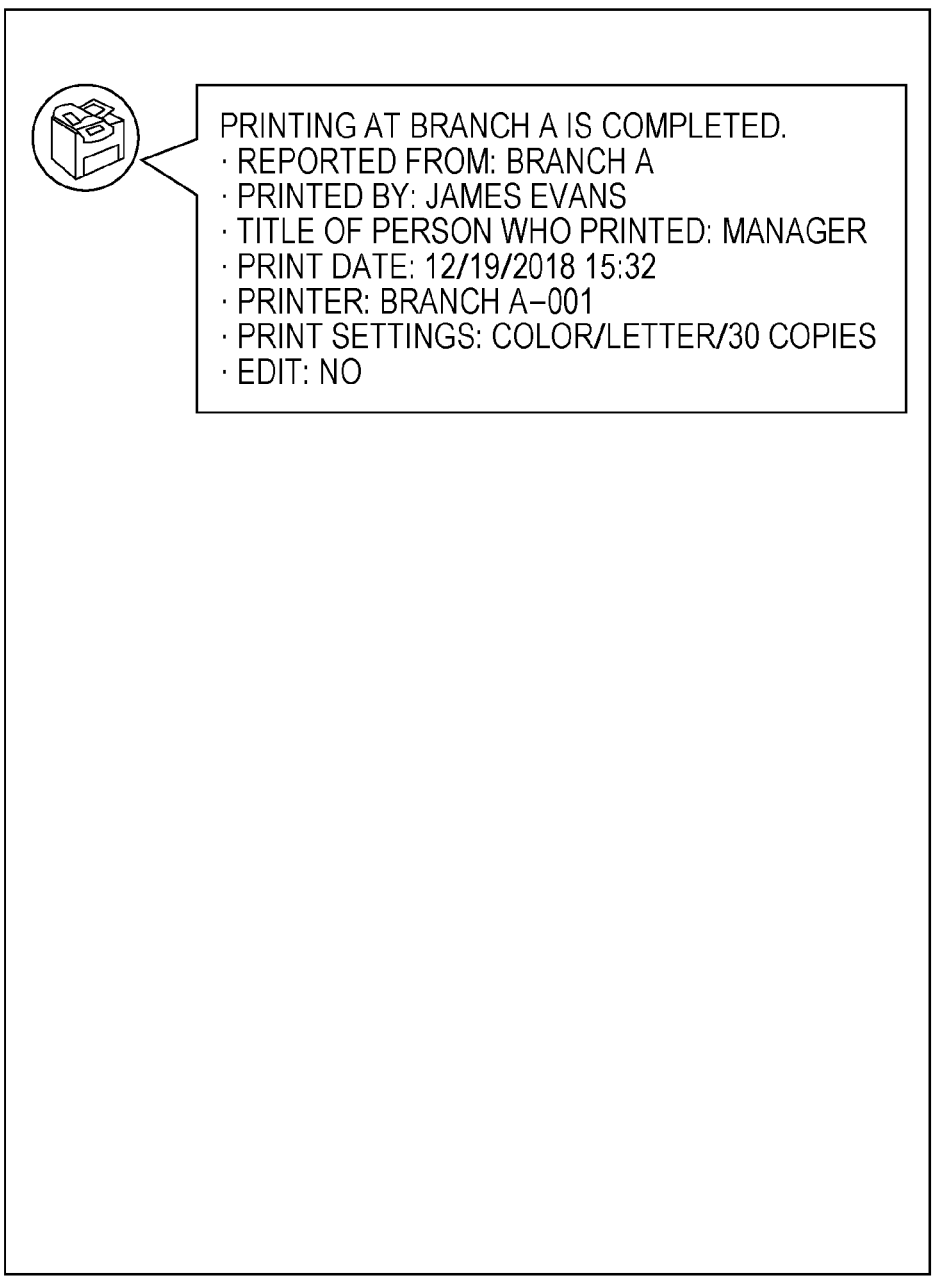
FIG. 12 illustrates an example of a screen of a talk room where printing information is posted when a file is not edited.

If there is a desire to manage the information on a paper medium in the head office, the chatbot gives a printing instruction to the image forming apparatus 40 of the head office simultaneously with the procedures (7) and (8) ((9) in FIG. 10). At this time, the paper size may vary depending on the branches and is therefore adjusted automatically based on a paper size set in the head office. If there is a desire to check differences by printing the file because of many differences, the manager of the head office may first view the posting in the procedures (7) and (8) and then print the file by posting a printing request message to the chatbot. For example, as illustrated in FIG. 11, the manager of the head office views the differences on a preview screen and switches the preview screen to a screen for causing the chatbot to give a printing instruction by performing an operation of selecting the difference preview. In addition to the display of the differences on the preview screen, the chatbot may post characters indicating the differences or post a suggestive description for the differences, such as a message reading "DIFFERENCES ARE HIGHLIGHTED IN RED BOXES" in FIG. 11. When the manager of the head office performs an operation of selecting a "PRINT" button, printing is performed in response to an instruction to print the edited file instead of the differential file. The edited file may be displayed as it is or a file manipulated to highlight edited portions may be printed so that the manager may easily grasp by sight that the file has been edited. If the file is output without editing, the chatbot posts only the printing information to the talk room of the head office. FIG. 12 illustrates an example of a screen of the talk room where the printing information is posted when the file is not edited. A message indicating printing completion at a branch A may be posted alone or related information may be posted together. The chatbot may post the preview selection or the printing instruction in FIG. 11 to the talk room of the branch to notify the participant in the talk room of the branch of a check status of the manager of the head office.

Figure 13:
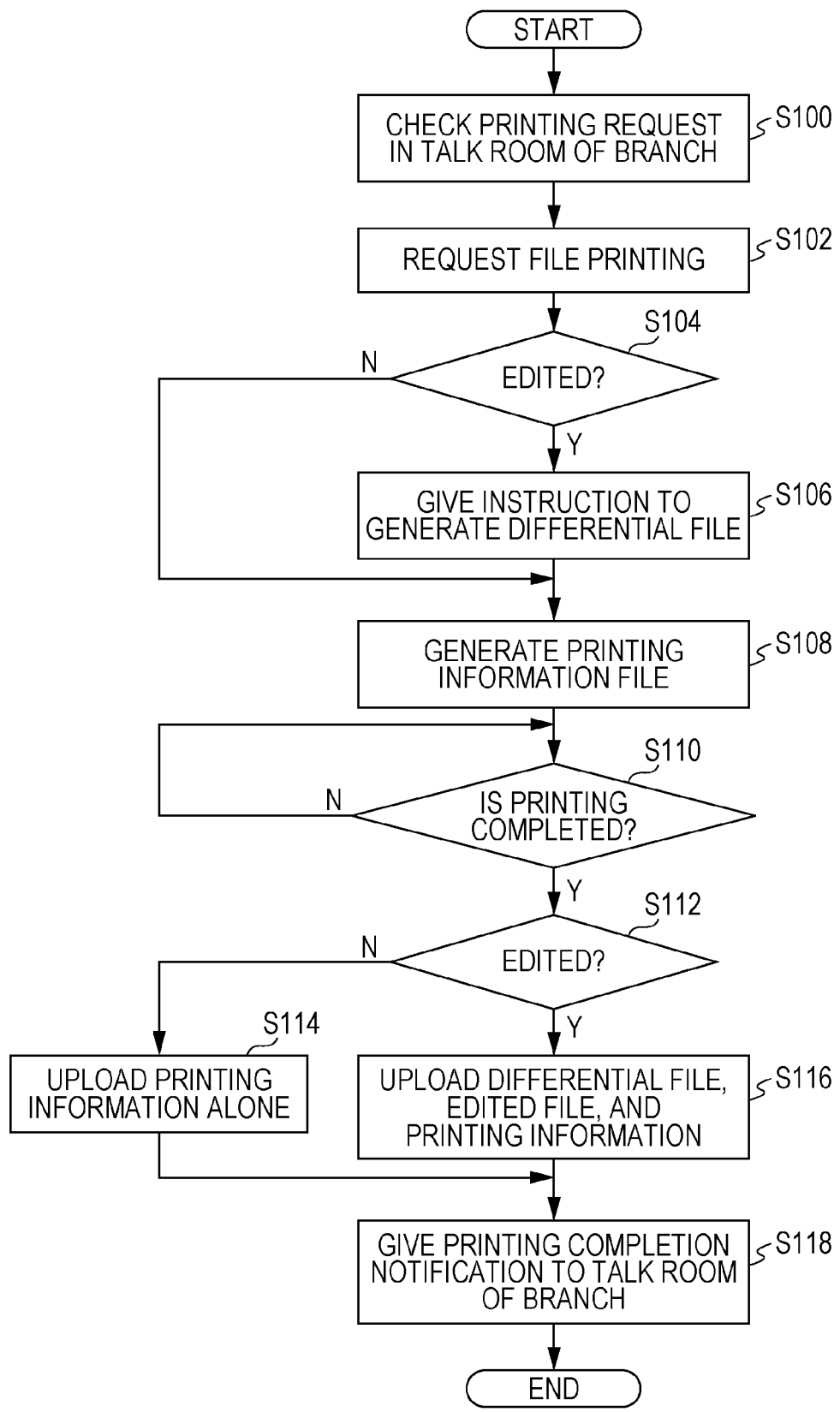
FIG. 13 is a flowchart illustrating an example of a flow of processing to be performed in the talk room of the branch by the chatbot server of the control system according to the exemplary embodiment.

Next, description is made of operations of the chatbot server 30 of the control system 11 according to this exemplary embodiment that is configurated as described above. FIG. 13 is a flowchart illustrating an example of a flow of processing to be performed in the talk room of the branch by the chatbot server 30 of the control system 11 according to this exemplary embodiment. The processing is performed such that the CPU 31 reads the control program from the ROM 32 or the storage 34 and executes the control program by loading the control program on the RAM 33. In FIG. 13, description is made under the assumption that the chatbot is used between the head office and the branch in the retailer similarly to the example described above. In FIG. 13, description is made of processing to be started when the talk room of the branch is generated as the individual talk room and then a printing instruction is posted to the talk room of the branch.

In Step S100, the CPU 31 checks a printing request in the talk room of the branch as the execution control part 302 and proceeds to Step S102. That is, the CPU 31 checks the printing request by acquiring information posted to the talk room of the branch from the talk room server 20.

In Step S102, the CPU 31 requests the image forming apparatus 40 to print a file and proceeds to Step S104.

In Step S104, the CPU 31 determines whether the file is edited. For example, the CPU 31 determines whether contents related to editing are posted to the talk room of the branch. When the determination is "YES", the CPU 31 proceeds to Step S106. When the determination is "NO", the CPU 31 proceeds to Step S108.

In Step S106, the CPU 31 gives an instruction to generate a differential file for the files before and after editing to the difference check service provided by the difference extraction server 70 and proceeds to Step S108. The difference extraction server 70 generates the differential file by extracting differences between the files before and after editing. The generated differential file may be returned to the chatbot server 30 and stored in the storage 34 or may be stored in the document server 50. Step S106 corresponds to an extractor.

In Step S108, the CPU 31 generates a printing information file and proceeds to Step S110. For example, the CPU 31 generates the printing information file by extracting an ID and a title from account information of a person who gives the printing instruction and extracting print settings and a print date at the time of printing and information on the image forming apparatus from a log of the image forming apparatus 40.

In Step S110, the CPU 31 determines whether the printing is completed. For example, the CPU 31 determines whether a printing completion notification is received from the image forming apparatus 40. The CPU 31 waits until the determination is "YES" and proceeds to Step S112.

In Step S112, the CPU 31 determines whether the file is edited based on the result of the determination of whether the file is edited in Step S104. When the determination is "NO", the CPU 31 proceeds to Step S114. When the determination is "YES", the CPU 31 proceeds to Step S116.

In Step S114, the CPU 31 uploads only the printing information to the document server 50 and proceeds to Step S118.

In Step S116, the CPU 31 uploads the differential file, the edited file, and the printing information to the document server 50 and proceeds to Step S118. In Step S116, the CPU 31 may upload at least one of the differential file, the edited file, and the printing information to the document server 50. Step S114 and Step S116 correspond to a poster.

In Step S118, the CPU 31 gives a printing completion notification to the talk room of the branch and terminates the series of processing operations.

Next, description is made of processing to be performed in the talk room of the head office by the chatbot after the processing of FIG. 13. FIG. 14 is a flowchart illustrating an example of a flow of the processing to be performed in the talk room of the head office by the chatbot server 30 of the control system 11 according to this exemplary embodiment. The processing of FIG. 14 is performed subsequently to the processing of FIG. 13.

In Step S200, the CPU 31 determines whether the file is edited based on the result of the determination of whether the file is edited in Step S104. When the determination is "YES", the CPU 31 proceeds to Step S202. When the determination is "NO", the CPU 31 proceeds to Step S204.

In Step S202, the CPU 31 posts a preview of the differential file to the talk room of the head office and proceeds to Step S204. That is, the CPU 31 downloads the differential file uploaded to the document server 50 and posts the preview to the talk room of the head office. Thus, the preview of the differential file is displayed in the talk room of the head office as illustrated in FIG. 11. For example, edited portions obtained due to the differences are displayed in the preview by highlighting the edited portions in red boxes or the like. Instead of being posted to the talk room of the head office, the differential file may be transmitted by electronic mail or the like to the user terminal 10 operated by the manager of the head office. In this manner, the manager of the head office may be notified of the difference extraction result. Step S202 corresponds to a notifier.

In Step S204, the CPU 31 posts the printing information to the talk room of the head office and proceeds to Step S206. That is, the CPU 31 downloads the printing information uploaded to the document server 50 and posts the printing information to the talk room of the head office. If the file is not edited, the CPU 31 posts only the printing information to the talk room of the head office as illustrated in FIG. 12. Instead of being posted to the talk room of the head office, the printing information may be transmitted by electronic mail or the like to the user terminal 10 operated by the manager of the head office. In this manner, the manager of the head office may be notified of the printing information. The manager of the head office may be notified of the printing information by establishing an individual talk room where the manager participates. Step S204 corresponds to the notifier and a result poster.

In Step S206, the CPU 31 determines whether a printing instruction is given. For example, the CPU 31 determines whether the manager of the head office switches the screen to a screen for the printing instruction by performing an operation of selecting the difference preview as illustrated in FIG. 11. When the determination is "YES", the CPU 31 proceeds to Step S208. When the determination is "NO", the CPU 31 terminates the series of processing operations.

In Step S208, the CPU 31 does not output the differential file to the image forming apparatus 40 but outputs the edited file associated with the differential file. The CPU 31 gives a printing instruction and terminates the series of processing operations. Thus, the image forming apparatus 40 prints the edited file. Step S208 corresponds to an outputter. In this exemplary embodiment, description is made of the example in which the edited file is output to the image forming apparatus 40 but the edited file may be transmitted by electronic mail or the like to the user terminal 10 operated by the manager of the head office.

Through the processing described above, the preview of the differential file, which is a result of the difference extraction before and after editing, is posted to the talk room of the head office. If the file is not edited, the printing information is posted. The method may be varied between the case in which the file is edited and the case in which the file is not edited. The method may be varied to facilitate distinction by sight. For example, posting is performed with a green indication when the file is edited and with a yellow indication when the file is not edited.

In this exemplary embodiment, description is made under the assumption that the talk rooms are the talk room of the head office and the talk room of the branch. The talk rooms need not be the talk room of the head office and the talk room of the branch. For example, this exemplary embodiment may be applied to a case in which a plurality of talk rooms exist, including a talk room where a printing instruction is given and a talk room where editing and printing are performed in actuality. As in this exemplary embodiment, it is more desirable that the talk rooms have a master/slave relationship (master: instruction side, slave: execution side) because the status of the execution side may be managed from the instruction side or a plurality of execution sides may be managed integrally.

The exemplary embodiment described above is directed to the exemplary case in which the talk room server 20, the chatbot server 30, the document server 50, and the difference extraction server 70 are separate apparatuses. The configuration is not limited thereto. For example, functions of at least two of the talk room server 20, the chatbot server 30, the document server 50, and the difference extraction server 70 may be implemented by a single server. Alternatively, a subset of the functions of the talk room server 20, the chatbot server 30, the document server 50, or the difference extraction server 70 may be implemented by still another server.

The processing to be performed by the chatbot server 30 according to the exemplary embodiment described above may be performed by software, by hardware, or by software and hardware in combination. The processing to be performed by the chatbot server 30 may be distributed by being stored in a storage medium as a program.

The program for operating the chatbot server 30 may be provided in the form of a computer readable recording medium such as a universal serial bus (USB) memory, a flexible disk, or a compact disc read only memory (CD-ROM) or may be provided online via a network such as the Internet. In this case, the program recorded in the computer readable recording medium is generally transferred to and stored in the memory or the storage. For example, the program may be provided as single application software or may be incorporated in software of each apparatus as one function of the chatbot server 30.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A controller comprising a display panel and configured to implement an extractor configured to:
    display, via the display panel, a first talk room where information is postable and viewable by each of a plurality of users comprising a first user and a second user,
    post, via the first talk room, instruction information comprising a file and an instruction from the first user for the second user to execute processing for the file, wherein the processing associated with the posted instruction information is executable,
    execute the processing associated with the instruction information in a second talk room associated with the second user, wherein the second talk room differs from the first talk room where the processing associated with the instruction information is posted, and
    extract a difference between the file before the processing and the file after the processing when the processing associated with the instruction information has been executed by the second user,
    wherein the file comprises a content to be edited, and the processing comprises an editing of the content to be printed.

2. The controller according to claim 1, further comprising a poster that posts an extraction result of the extractor to the first talk room where the instruction information is posted.

3. The controller according to claim 2, wherein the poster posts the extraction result when the instruction information includes an instruction for editing processing for the file and an instruction for output processing for the file.

4. The controller according to claim 2, further comprising an outputter that posts, to the first talk room, output instruction information indicating an instruction to output a processed file associated with the extraction result posted by the poster and outputs the processed file to a predetermined apparatus when the instruction to output the processed file is given by the output instruction information.

5. The controller according to claim 2, wherein, in the second talk room where the processing associated with the instruction information is executed, the poster further posts, to the first talk room where the instruction information is posted, at least one piece of processing information out of user identification information for identifying a user who gives the instruction to execute the processing for the file and a result of execution of the processing for the file.

6. The controller according to claim 1, further comprising a result poster configured such that, if the processing for the file is executed without posting an instruction to edit the file in the second talk room where the processing associated with the instruction information is executed, at least one piece of processing information out of user identification information for identifying a user who gives the instruction to execute the processing for the file and a result of execution of the processing for the file is posted to the first talk room where the instruction information is posted without extraction by the extractor.

7. The controller according to claim 1, further comprising a notifier that notifies a user who posts the instruction information of an extraction result of the extractor.

8. The controller according to claim 7, wherein, if the processing for the file is executed without posting an instruction to edit the file in the second talk room where the processing associated with the instruction information is executed, the notifier notifies the user who posts the instruction information of at least one piece of processing information out of user identification information for identifying the user who gives the instruction to execute the processing for the file and a result of execution of the processing for the file without extraction by the extractor.

9. The controller according to claim 1, wherein when the instruction information is posted in the first talk room and the processing associated with the instruction information has been executed in the second talk room, the first user is unable to check the difference between the file before the processing and the file after the processing in the first talk room.

10. A controller comprising a display panel and configured to implement:
a generator configured to:
display, via the display panel, a first talk room where information is postable and viewable by each of a plurality of users comprising a first user and a second user,
post, via the first talk room, instruction information comprising a file and an instruction from the first user for the second user to execute processing for the file, and
generate an individual talk room where the second user is included and posting related to the file is received, wherein the individual talk room is generated independently from the first talk room; and
an extractor configured to:
execute the processing associated with the instruction information in the individual talk room associated with the second user, and
extract a difference between the file before the processing and the file after the processing when the processing associated with the instruction information has been executed by the second user,
wherein the file comprises a content to be edited, and the processing comprises an editing of the content to be printed.

11. The controller according to claim 10, further comprising a poster that posts an extraction result of the extractor to the first talk room where the instruction information is posted.

12. The controller according to claim 11, wherein the poster posts the extraction result when the instruction information includes an instruction for editing processing for the file and an instruction for output processing for the file.

13. The controller according to claim 11, further comprising an outputter that posts, to the first talk room, output instruction information indicating an instruction to output a processed file associated with the extraction result posted by the poster and outputs the processed file to a predetermined apparatus when the instruction to output the processed file is given by the output instruction information.

14. The controller according to claim 11, wherein, in the individual talk room where the processing associated with the instruction information is executed, the poster further posts, to the first talk room where the instruction information is posted, at least one piece of processing information out of user identification information for identifying the first user who gives the instruction to execute the processing for the file and a result of execution of the processing for the file.

15. The controller according to claim 10, further comprising a result poster configured such that, if the processing for the file is executed without posting an instruction to edit the file in the individual talk room where the processing associated with the instruction information is executed, at least one piece of processing information out of user identification information for identifying the first user who gives the instruction to execute the processing for the file and a result of execution of the processing for the file is posted to the first talk room where the instruction information is posted without extraction by the extractor.

16. The controller according to claim 10, further comprising a notifier that notifies the first user who posts the instruction information of an extraction result of the extractor.

17. The controller according to claim 16, wherein, if the processing for the file is executed without posting an instruction to edit the file in the individual talk room where the processing associated with the instruction information is executed, the notifier notifies the first user who posts the instruction information of at least one piece of processing information out of user identification information for identifying the first user who gives the instruction to execute the processing for the file and a result of execution of the processing for the file without extraction by the extractor.

18. A control system comprising:
a provider that provides a first talk room where information is postable and viewable by each of a plurality of users comprising a first user and a second user and,
post, via the first talk room, instruction information comprising a file and an instruction from the first user for the second user to execute processing for the file, wherein the processing associated with the posted instruction information is executable; and
an extractor configured to display the first talk room provided by the provider,
post, via the first talk room, instruction information comprising a file and an instruction from the first user for the second user to execute processing for the file, wherein the processing associated with the posted instruction information is executable,
execute the processing associated with the instruction information in a second talk room associated with the second user, wherein the second talk room differs from the first talk room where the processing associated with the instruction information is posted, and
extract a difference between the file before the processing and the file after the processing when the processing associated with the instruction information has been executed by the second user,
wherein the file comprises a content to be edited, and the processing comprises an editing of the content to be printed.

* * * * *